United States Patent
Rao et al.

(10) Patent No.: US 10,747,367 B2
(45) Date of Patent: Aug. 18, 2020

(54) OBDII FAILURE DIAGNOSTICS TECHNIQUES FOR KNOBS AND BUTTONS

(71) Applicant: GM Global Technology Operations LLC, Detroit, MI (US)

(72) Inventors: Jayasimha V. Rao, Troy, MI (US); James A. Carpenter, Rochester Hills, MI (US); Michael J. Boesch, Royal Oak, MI (US); Zhongya Lou, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 16/146,068

(22) Filed: Sep. 28, 2018

(65) Prior Publication Data

US 2020/0104006 A1 Apr. 2, 2020

(51) Int. Cl.
*G06F 3/041* (2006.01)
*G07C 5/08* (2006.01)

(52) U.S. Cl.
CPC ......... *G06F 3/0418* (2013.01); *G07C 5/0808* (2013.01)

(58) Field of Classification Search
CPC ............... G06F 3/0418; G06F 345/156; G06F 345/172–174; G07C 5/0808
See application file for complete search history.

(56) References Cited

U.S. PATENT DOCUMENTS

| | | | | |
|---|---|---|---|---|
| 9,846,495 | B2* | 12/2017 | Upmanue | G06F 3/038 |
| 10,483,057 | B2* | 11/2019 | Sawada | G06F 3/03547 |
| 2006/0256090 | A1* | 11/2006 | Huppi | A63F 13/02 |
| | | | | 345/173 |
| 2008/0238879 | A1* | 10/2008 | Jaeger | G06F 3/03545 |
| | | | | 345/173 |
| 2008/0309631 | A1* | 12/2008 | Westerman | G06F 1/3203 |
| | | | | 345/173 |
| 2018/0024649 | A1* | 1/2018 | Uno | G06F 3/041 |
| | | | | 345/174 |

* cited by examiner

*Primary Examiner* — Bryan Earles (57) ABSTRACT

A system for failure diagnostics for a Human Machine Interface (HMI) includes a physical knob, a button, and a touchscreen interface. The physical knob and the button disposed on the touchscreen interface and in communication with the touchscreen interface. The system further includes a touch sensor in communication with the touchscreen interface, and a controller in communication with the touch sensor, the controller having memory for storing control logic and a processor configured to execute the control logic, the control logic including a first logic for determining a state of the touchscreen interface, and a second logic for determining a state of a portion of the touchscreen interface smaller than a full area of the touchscreen interface.

17 Claims, 5 Drawing Sheets

OBDII FAILURE DIAGNOSTICS TECHNIQUES FOR KNOBS AND BUTTONS

INTRODUCTION

The statements in this section merely provide background information relating to the present disclosure, and may not constitute prior art.

The present disclosure relates generally to human-machine interfaces (HMIs), and more specifically to motor vehicle interiors with knobs, dials, buttons, and the like for controlling motor vehicle systems. The increasing usage of smart phones, tablets, and other such touch-screen-controlled devices has driven change within the automotive industry as well. Motor vehicle interiors are increasingly being designed with and equipped with a variety of touch-based human interface devices (HMIs). Such touch-based HMIs often display and provide access to a wide variety of systems and information, such as: climate control information, audio and/or video entertainment information, navigational information, suspension information, steering information, seating information, and the like. Moreover, touch-based HMIs offer advantages over traditional mechanical and/or mechanical button and knob-based systems, as touch-based HMIs can be used in locations, and for purposes for which traditional mechanical and/or mechanical button and knob-based systems are less well suited. Touch-based HMIs are often relatively physically thin by comparison to traditional mechanical and/or mechanical button and knob-based systems. Accordingly, touch-based HMIs can be placed in locations in which traditional mechanical and/or mechanical button and knob-based systems cannot fit. However, despite the substantial utility, and packageability of such touch-based HMIs, touch-based HMIs present also present diagnostic and usability challenges by comparison with traditional mechanical and/or mechanical button and knob-based systems. Moreover, touch-based HMIs also face regulatory challenges that traditional mechanical and/or mechanical button and knob-based systems have largely overcome.

Accordingly, while traditional mechanical and/or mechanical button and knob-based systems and typical touch-based HMIs operate for their intended purpose, there is a need in the art for new and improved touch-based HMIs and diagnostic systems and methods for improved touch-based HMIs that meet regulatory standards while decreasing driver distractions, and while increasing the resiliency, robustness, and accuracy of diagnostics for the touch-based HMIs.

SUMMARY

According to several aspects of the present disclosure a system for failure diagnostics for a Human Machine Interface (HMI) includes: a physical knob; a button; a touchscreen interface; the physical knob and the button disposed on the touchscreen interface and in communication with the touchscreen interface; a touch sensor in communication with the touchscreen interface; and a controller in communication with the touch sensor, the controller having memory for storing control logic and a processor configured to execute the control logic, the control logic including a first logic for determining a state of the touchscreen interface, and a second logic for determining a state of a portion of the touchscreen interface smaller than a full area of the touchscreen interface.

In another aspect of the present disclosure each of the physical knob and the button further comprise a plurality of contact pads disposed on a lower surface of the physical knob and proximate the touchscreen interface and a lower surface of the button proximate the touchscreen interface.

In yet another aspect of the present disclosure the plurality of contact pads is distributed asymmetrically across the lower surface of the physical knob.

In yet another aspect of the present disclosure the touchscreen interface further comprises a sensing grid in communication with the touch sensor via a cable, the sensing grid having electrical traces, and a first plurality of electrical traces electrically interacts with a second plurality of electrical traces, and forms a plurality of sensing nodes.

In yet another aspect of the present disclosure the plurality of contact pads have a predetermined diameter selected to interact with the plurality of sensing nodes.

In yet another aspect of the present disclosure the sensing nodes register at least one of: a presence, an absence, or a proximity of a contact pad disposed on the physical knob or button.

In yet another aspect of the present disclosure the system for failure diagnostics for an HMI further includes a third logic for determining whether a majority of the contact pads disposed on the button and the physical knob are interacting with the sensing nodes, and selectively generating and storing a diagnostic code in memory and selectively generating a notification for a user of the HMI.

In yet another aspect of the present disclosure a pitch of the electrical traces includes the sensing grid is variable across the touchscreen interface.

In yet another aspect of the present disclosure a first pitch of the electrical traces includes the sensing grid is optimized for use with the physical knob and the button.

In yet another aspect of the present disclosure a second pitch of the electrical traces includes the sensing grid is optimized for use with a finger, and the first pitch is smaller than the second pitch.

In yet another aspect of the present disclosure the first logic further includes: determining, from data generated by a third plurality of electrical traces defining a perimeter of the touchscreen interface, an electrical and physical continuity of an entire surface of the touchscreen interface, and the second logic further includes: determining, from data generated by a fourth plurality of electrical traces defining a button zone or loop in the portion of the touchscreen interface smaller than the full area of the touchscreen interface, an electrical and physical continuity of the surface of the touchscreen interface making up the portion of the touchscreen interface.

In yet another aspect of the present disclosure a system for failure diagnostics for a Human Machine Interface (HMI) in a motor vehicle includes a physical knob; a button; a plurality of contact pads disposed on a lower surface of each of the physical knob and the button; a touchscreen interface having a plurality of electrical traces disposed at predefined angles to one another forming a sensing grid having a plurality of sensing nodes; the physical knob and the button disposed on the touchscreen interface and in communication with the touchscreen interface via the contact pads. The system further includes a touch sensor in communication with the touchscreen interface through a cable; and a controller in communication with the touch sensor, the controller having memory for storing control logic and a processor configured to execute the control logic, the control logic including a first logic for determining an electrical continuity of the touchscreen, a second logic for determining an electrical continuity of a portion of the touchscreen smaller than a full area of the touchscreen, and a third logic for determining whether a majority of the contact pads disposed on the button and the physical knob are interacting with the sensing grid and selectively generating and storing a diagnostic code in memory and selectively generating a notification for a user of the HMI.

In yet another aspect of the present disclosure the plurality of contact pads is distributed asymmetrically across a lower surface of the physical knob and across a lower surface of the button.

In yet another aspect of the present disclosure the plurality of contact pads have a predetermined diameter selected to interact precisely with the plurality of sensing nodes, and the sensing nodes register at least one of: a presence, an absence, or a proximity of at least one contact pad disposed on the physical knob or button.

In yet another aspect of the present disclosure a pitch of the electrical traces includes the sensing grid is variable across the touchscreen interface.

In yet another aspect of the present disclosure a first pitch of the electrical traces includes the sensing grid is optimized for use with the physical knob and the button.

In yet another aspect of the present disclosure a second pitch of the electrical traces includes the sensing grid is optimized for use with a finger, and the first pitch is smaller than the second pitch.

In yet another aspect of the present disclosure the first logic further includes: determining, from data generated by a third plurality of electrical traces defining a perimeter of the touchscreen interface, an electrical and physical continuity of an entire surface of the touchscreen interface, and the second logic further includes: determining, from data generated by a fourth plurality of electrical traces defining a button zone or loop in the portion of the touchscreen interface smaller than the full area of the touchscreen interface, an electrical and physical continuity of the surface of the touchscreen interface making up the portion of the touchscreen interface.

In yet another aspect of the present disclosure the third logic further includes generating an estimated position of the physical knob and the button based on a position of the majority of the contact pads.

In yet another aspect of the present disclosure a system for diagnostics for a Human Machine Interface (HMI) in a motor vehicle includes a touchscreen interface having a plurality of electrical traces disposed at predefined angles to one another forming a sensing grid, a first plurality of electrical traces intersects at the predefined angles with a second plurality of electrical traces, and forms a plurality of sensing nodes at each intersection, a pitch of the electrical traces composing the sensing grid being variable across the touchscreen interface, a first pitch of the electrical traces comprising the sensing grid is optimized for use with a physical knob and a button. The system further includes a plurality of contact pads disposed asymmetrically on a lower surface of each of the physical knob and the button, the contact pads having a predetermined diameter selected to interact precisely with the plurality of sensing nodes, and the plurality of sensing nodes register at least one of: a presence, an absence, or a proximity of at least one contact pad disposed on the physical knob or button, and a second pitch of the electrical traces comprising the sensing grid is optimized for use with a finger, and the first pitch is smaller than the second pitch; the physical knob and the button disposed on the touchscreen interface and in communication with the touchscreen interface via the contact pads. The system further includes a touch sensor in communication with the touchscreen interface through a cable. The system further includes a controller in communication with the touch sensor, the controller having memory for storing control logic and a processor configured to execute the control logic, the control logic including a first logic for determining, from data generated by a third plurality of electrical traces defining a perimeter of the touchscreen interface, an electrical and physical continuity of an entire surface of the touchscreen interface, a second logic for determining, from data generated by a fourth plurality of electrical traces defining a button zone or loop in the portion of the touchscreen interface smaller than the full area of the touchscreen interface, an electrical and physical continuity of the surface of the touchscreen interface making up the portion of the touchscreen interface, and a third logic for determining whether a majority of the contact pads disposed on the button and the physical knob are interacting with the sensing grid and selectively generating and storing a diagnostic code in memory and selectively generating a notification for a user of the HMI, the third logic generating an estimated position of the physical knob and the button based on a position of the majority of the contact pads.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "computer" or "controller" as used herein generally includes any electronic control device having a preprogrammed digital computer or processor, memory or non-transitory computer readable medium used to store data such as control logic, software applications, instructions, computer code, software, or applications, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code, software, or applications includes any type of program code, including source code, object code, and executable code. The processor is configured to execute the code or instructions. In some examples, the computer or server also includes a dedicated Wi-Fi controller configured to wirelessly communicate with wireless communications hotspots using Wi-Fi protocols under IEEE 802.1X.

The computer or server further includes one or more applications. An application is a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within the memory or in additional or separate memory. Examples of the applications include audio or video streaming services, games, browsers, social media, network management systems, directory access and management systems, and the like, without departing from the scope or intent of the present disclosure.

The following description is merely exemplary in nature and is not intended to limit the present disclosure, application, or uses.

Figure 1:
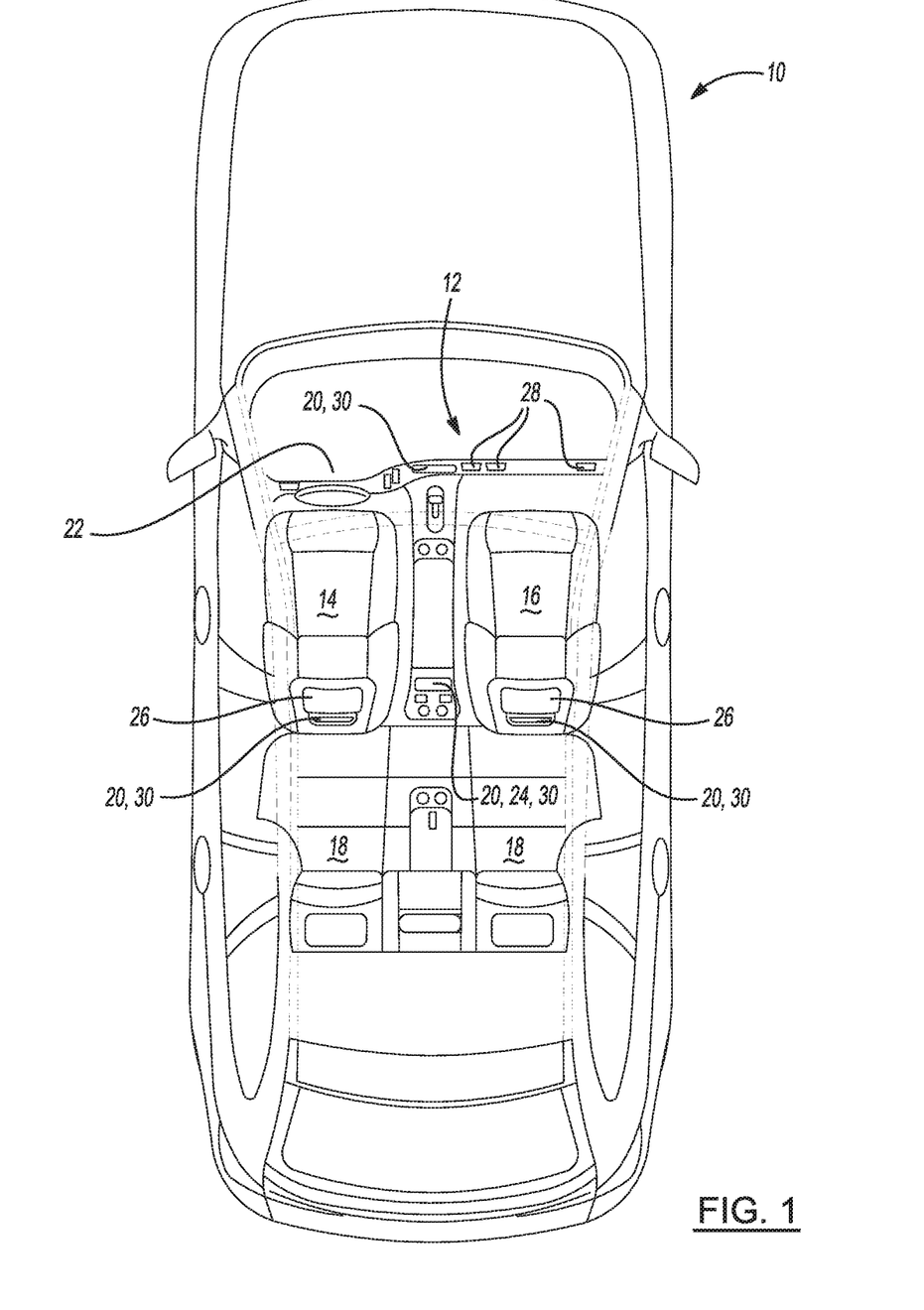
FIG. 1 is an environmental view of a motor vehicle having a human machine interface (HMI) having buttons and knobs according to one aspect of the present disclosure.

Referring to FIG. 1 a motor vehicle is shown and generally indicated by reference number 10. While the motor vehicle 10 illustrated is a car, it should be appreciated that the motor vehicle 10 may be any type of vehicle, including a motorcycle, an autocycle, a car, a van, a truck, bus, a semi, a motor home, etc. The motor vehicle 10 includes a variety of interconnected systems and hardware components that will be described in further detail herein. The variety of interconnected systems and hardware components are in communication via an on-board diagnostics system known as OBDII and capable of generating a plurality of diagnostic trouble codes (DTCs) relating to the operational characteristics of the variety of systems and hardware components. The motor vehicle 10 has a passenger compartment 12 equipped with a driver's seat 14, a passenger seat 16, and rear passenger seats 18. The motor vehicle 10 as depicted includes only four seats 14, 16, 18, however it should be appreciated that depending on the type of motor vehicle 10, the quantity and placement of the seats 14, 16, 18 may vary substantially. The passenger compartment 12 includes at least one human machine interface (HMI) 20. The HMI 20 is shown disposed substantially equidistant from each of the driver seat 14 and the passenger seat 16, and mounted to a dashboard 22. Additional HMIs 20 may be disposed at other locations within the motor vehicle 10 passenger compartment 12, such as between the rear seats 18, on a center console 24, in headrests 26 of the driver seat 14 and passenger seat 16, or the like, without departing from the scope or intent of the present disclosure. While the HMI 20 is shown as being disposed in the passenger compartment 12 of a motor vehicle 10, it should be appreciated that the substantially the same structures and functional design characteristics of the HMIs 20 described herein may be found in entirely different applications and industries, such as home stereo systems, consumer electronics, avionics, and industrial applications without departing from the scope or intent of the present disclosure.

Figure 2:
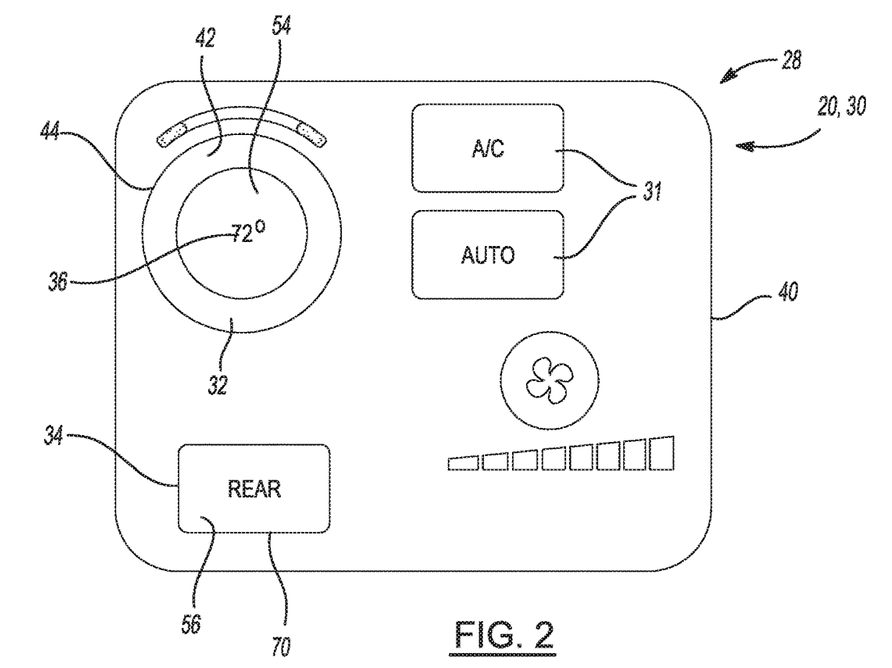
FIG. 2 is a screen shot of an HMI having buttons and knobs according to an aspect of the present disclosure.

Turning now to FIG. 2, and with continuing reference to FIG. 1, the HMI 20 is an electronic or electromechanical interface providing an occupant of the motor vehicle 10 access to a variety of on-board systems. In some aspects, the HMI 20 provides interactive access to a heating, ventilation and air conditioning (HVAC) system 28, an audio/visual (A/V) entertainment system (not specifically shown), a navigation system (not specifically shown), and other such systems within the motor vehicle 10. The HMI 20 is a touch-based device receiving and responding to user inputs via resistive, capacitive, infrared, surface acoustic wave, optical, electromagnetic guidance, or other touch sensors or sensing grids. More specifically, the touch-based device of the HMI 20 is a touchscreen or touch panel 30. The touchscreen 30 may have any of a wide variety of different sizes and shapes depending on the particular motor vehicle 10 application, and/or the purpose or placement of the touchscreen 30 within the motor vehicle 10 passenger compartment 12. However, with solely touch-based HMIs 20, tactile feedback from the HMIs 20 may not exist, or may be difficult for a driver or other occupant of the motor vehicle 10 to interpret. Accordingly, the HMI 20 of some examples includes not only virtual buttons 31 generated by software and displayed on the touchscreen 30, but at least one physical knob 32 and/or physical button 34.

In some aspects, the at least one physical knob 32 and/or physical button 34 is mounted to the touchscreen 30 of the HMI 20. The physical knob 32 is rotatable about an axis of rotation 36. In several aspects, the axis of rotation 36 is substantially orthogonal to a plane 38 substantially defined by an interface surface 40 of the touchscreen 30. In another aspect, the axis of rotation 36 of the physical knob 32 is parallel to the plane 38 defined by the interface surface 40 of the touchscreen 30, such as in the case of a scrolling wheel (not specifically shown), or the like. In further aspects, the axis of rotation 36 of the physical knob 32 may be directionally variable. That is, the physical knob 32 of some examples has a substantially spherical shape and is rotatable in any direction. Additionally, the physical knob 32 of some examples is displaceable as well as rotatable about the axis of rotation 36. In other words, the physical knob 32 may move in a direction parallel to the plane 38 defined by the interface surface 40 while also being rotatable about the axis of rotation 36. Accordingly, it should be appreciated that while the bulk of this description focuses on physical knobs 32 having an axis of rotation 36 substantially orthogonal to the plane 38 defined by the interface surface 40, the axis of rotation 36 may translate along the interface surface 40, or vary substantially from orthogonal or parallel to the interface surface 40 without departing from the scope or intent of the present disclosure. The physical knob 32 may be mounted to the touchscreen 30 of the HMI 20 in a variety of different ways including mechanical fasteners (not specifically shown), chemical fasteners such as glues (not specifically shown), or the like without departing from the scope or intent of the present disclosure. In several aspects, the physical knob 32 has an upper surface 42, a knob exterior perimeter 44, and a lower surface 46. In some examples, the upper surface 42 is substantially planar and parallel to the interface surface 40 of the touchscreen 30. In other examples, the upper surface 42 has a concave shape, a convex shape, and is a smooth, glossy, and/or a knurled or otherwise textured surface. The knob exterior perimeter 44 has a substantially cylindrical shape joined at an upper boundary 48 to the upper surface 42 and joined at a lower boundary 50 to the lower surface 46. In several examples, the knob exterior perimeter 44, like the upper surface 42, has a concave shape, a convex shape, a smooth glossy and/or knurled or otherwise textured surface. In particular the knob exterior perimeter 44 is sized and shaped to fit comfortably within, provide grip to, and to be manipulated easily by the fingers of a hand. The lower surface 46 is substantially planar and parallel to the interface 40 of the touchscreen 30. The lower surface 46 includes a plurality of contact pads 52. In some examples, the upper surface 42 further includes an electronic display 54. The electronic display 54 selectively displays information regarding any of a variety of functions to which the physical knob 32 has access. In one aspect, the electronic display 54 selectively displays climate control information for the passenger compartment 12, such as temperature, fan speed, of the like. In another aspect, the electronic display 54 selectively displays audio or entertainment information such as radio station, volume level, or the like.

As mentioned above, the touchscreen 30 of some examples includes at least one physical button 34. The physical button 34, like the physical knob 32 is mounted to the touchscreen 30 of the HMI 20 in any of a variety of different ways including mechanical fasteners (not specifically shown), chemical fasteners such as glues (not specifically shown), or the like without departing from the scope or intent of the present disclosure. In several aspects, the physical button 34 has a button upper surface 56, a button exterior perimeter 70, and a button lower surface 60. In some examples, the button upper surface 56 is substantially planar and parallel to the interface surface 40 of the touchscreen 30. In other examples, the button upper surface 56 has a concave shape, a convex shape, and is a smooth, glossy, and/or a knurled or otherwise textured surface. The button exterior perimeter 70 may take any of a variety of different shapes in accordance with design, packaging, and usage pattern information for functions accessed by use of the physical button 34. That is, the physical button 34 may have a button exterior perimeter 70 that is substantially cylindrical, rectangular, ovoid, or any of a variety of other shapes without departing from scope or intent of the present disclosure. The button exterior perimeter 70 is joined at an upper perimeter boundary 62 to the button upper surface 56 and joined at a lower perimeter boundary 64 to the button lower surface 60. In several examples, the button exterior perimeter 70, like the button upper surface 56, has a concave shape, a convex shape, a smooth glossy and/or knurled or otherwise textured surface. The button lower surface 60 is substantially planar and parallel to the interface 40 of the touchscreen 30. The button lower surface 60, like the lower surface 46 of the physical knob 32 includes a plurality of contact pads 52. In some examples, like the physical knob 32, the button upper surface 56 further includes an electronic display 54. In some aspects, the electronic display 54 of the physical button 34 selectively displays climate control information, audio or entertainment information, communications information, or the like, depending on the functions being accessed via the HMI 20 by a user at a given point in time. The physical button 34 may take any of a variety of different forms without departing from the scope or intent of the present disclosure, for example, the physical button 34 may be a toggle switch, a press and release button, or a button having detents or no detents.

Figure 3A:
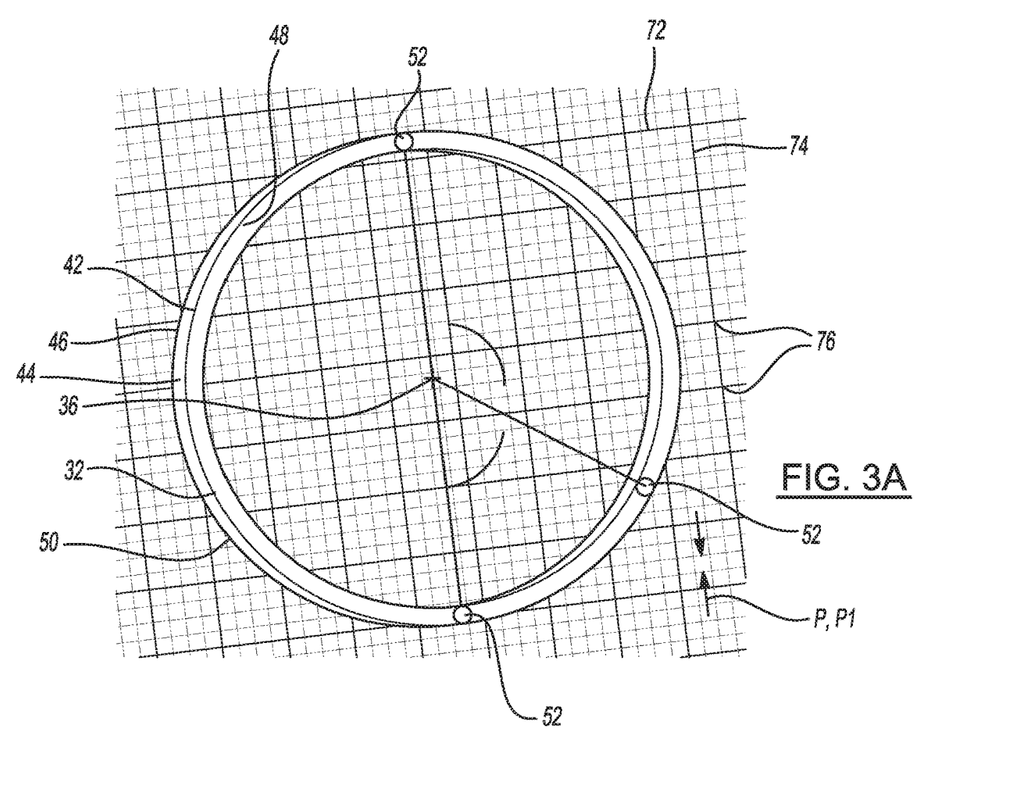
FIG. 3A is a schematic functional view of a portion of an HMI having a knob according to an aspect of the present disclosure.
Figure 3B:
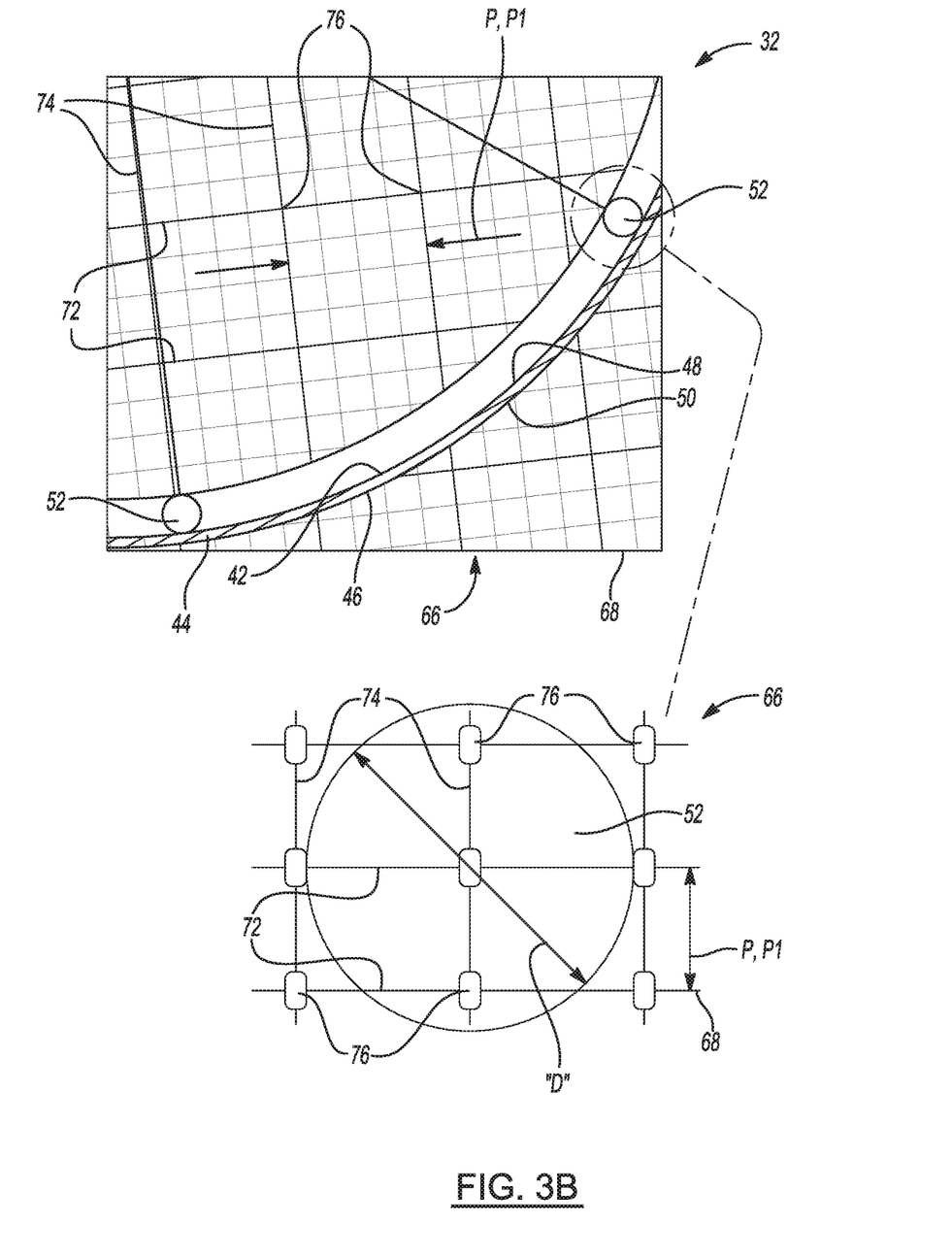
FIG. 3B is a schematic functional view of a portion of the HMI having a knob of FIG. 3B according to another aspect of the present disclosure.

Turning now to FIGS. 3A and 3B, and with continued reference to FIGS. 1 and 2, the contact pads 52 are placed at predetermined locations on the lower surface 46 of the physical knob 32. In several aspects, while the rest of the physical knob 32 is generally not in direct physical contact with the interface surface 40 of the touchscreen 30, the contact pads 52 are in direct physical contact with the interface surface 40. Moreover, the contact pads 52 support the physical knob 32 and among other purposes at least partially discourage or otherwise mitigate wobble of the physical knob 32. The contact pads 52 are formed of a material having properties enabling each contact pad 52 to interact with a sensing grid 66 disposed in the interface 40 of the touchscreen 30. The contact pads 52 are made of any of a variety of materials having capacitive, inductive, or other electromagnetic properties allowing the contact pads 52 to both physically and electronically interact with the interface 40 of the touchscreen 30. That is, in several aspects, the contact pads 52 are made of capacitive, inductive, or otherwise electromagnetically responsive materials. The contact pads 52 of some examples are formed unitarily with the physical knob 32, while in other examples, the contact pads 52 are formed separately from the physical knob 32 and then attached to the physical knob 32 by mechanical fasteners, chemical fasteners such as glues or the like, or other attachment mechanisms.

In several aspects, the contact pads 52 are disposed around a circumferential aspect of the lower surface 46 of the physical knob 32. In one example, the contact pads 52 are evenly or symmetrically distributed about the circumferential aspect of the lower surface 46 of the physical knob 32, while in another example, the contact pads 52 are unevenly or asymmetrically distributed about the circumferential aspect of the lower surface 46 of the physical knob 32. In an example in which the contact pads 52 are distributed asymmetrically about the circumferential aspect of the lower surface 46 of the physical knob 32, the asymmetric placement of the contact pads 52 provides a means of precisely and accurately determining a rotational position of the physical knob 32 in relation to the interface 40 of the touchscreen 30. Moreover, if one or more of the contact pads 52 of a physical knob 32 suffers from aging effects or otherwise partially or completely fails to contact and/or interact with the interface 40 of the touchscreen 30, because of the asymmetrical distribution of the contact pads 52, the rotational position of the physical knob 32 is still accurately and precisely determinable. Accordingly a quantity of contact pads 52 is selected to provide accuracy, precision, and granularity of positional data while also providing sufficient resiliency and redundancy to provide accurate positional data despite the failure of some of the contact pads 52 of the physical knob 32 to contact the interface 40 of the touchscreen 30.

The quantity of contact pads 52 affixed to a given physical knob 32 or physical button 34 may vary substantially from application to application. That is, depending on the dimensions of a particular physical knob 32 or physical button 34, and depending on the intended use of the particular physical knob 32 or physical button 34, the number and placement of the contact pads 52 affixed to the knob 32 or physical button 34 may vary. In another aspect, the contact pads 52 are placed at predetermined locations on the button lower surface 60 and provide both mechanical stability and an electronic connection between the physical button 34 and the interface 40 of the touchscreen 30. In some aspects, each of the contact pads 52 of a given physical knob 32 or physical button 34 have substantially the same dimensions as the other contact pads 52 mounted to the physical knob 32 or physical button 34. In other aspects, the contact pads 52 of a given physical knob 32 or physical button 34 may vary in size, shape, thickness, and the like without departing from the scope or intent of the present disclosure. The contact pads 52 are optimally sized and shaped to fit with the physical knob 32 and/or physical button 34 to which the contact pads 52 are attached. Moreover, depending on the application, the contact pads 52 for a particular physical knob 32 or physical button 34 may vary substantially in size from one contact pad 52 to another about the circumferential aspect of the lower surface 46 of a single physical knob 32. The size and construction of each of the contact pads 52 allows the contact pads 52 to meet, interact with, and provide well-defined, precise, and accurate physical and electronic input to the interface 40 of the touchscreen 30.

Figure 4:
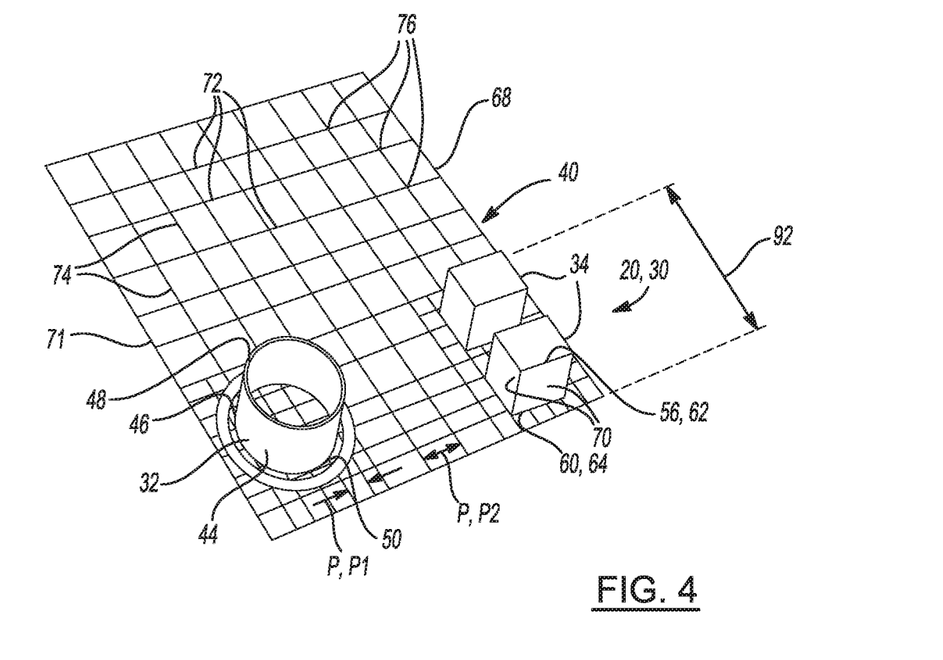
FIG. 4 is a schematic view of a sensing grid of an HMI having a knob and buttons according to an aspect of the present disclosure.

Turning now to FIG. 4, and with continuing reference to FIGS. 1-3A, the sensing grid 66 is formed from a plurality of electronic traces 68 on or in the interface 40 of the touchscreen 30. The electronic traces 68 define a perimeter 71 of the interface 40 of the touchscreen 30. The electronic traces 68 also traverse the sensing grid 66. In several aspects, electronic traces 68 extend across the interface 40 from perimeter 71 to perimeter 71 and define a substantially orthogonal series of electronic trace 68 lines. That is, the sensing grid 66 is defined by a first plurality 72 of electronic traces 68, and extending parallel to one another, and a second plurality 74 of electronic traces 68 extending parallel to one another and perpendicular to the first plurality 72 of electronic traces 68. However, it should be appreciated that while the sensing grid 66 has been described as being formed of substantially orthogonal series of electronic traces 68, the electronic traces 68 of some examples may be angled with respect to one another at non-orthogonal angles, or the electronic traces 68 may be curvilinear and intersect at a wide variety of different angular measures without departing from the scope or intent of the present disclosure. Additionally, in some examples the sensing grid 66 may be better described as a multi-layer sensing grid 66 in which one or more sensing grid 66 layers is a substantially continuous solid sheet and at least one additional sensing grid layer 66 is composed of a plurality of electronic traces 68 which interact electrically with the substantially continuous solid sheet. In several aspects, a plurality of sensing nodes 76 are defined by intersections of the first plurality 72 and second plurality 74 of electronic traces 68. However, it should be appreciated that depending on the construction of the sensing grid 66, the sensing nodes 76 may be disposed at other locations along the electronic traces 68 without necessarily being located at intersections of the first and second pluralities 72, 74 of electronic traces 68. Via the sensing nodes 76, the sensing grid 66 detects a change in an electrical characteristic of the touchscreen 30. That is, the sensing grid 66 senses changes in the electric and/or magnetic fields of the touchscreen 30 as one or more of the contact pads 52 passes over or near one or more of the sensing nodes 76. That is, the sensing nodes 76 electronically and/or magnetically interact with the contact pads 52 and generate position information for the physical knob 32, as well as for the physical button 34, if the HMI 20 is so-equipped. In one example, the sensing grid 66 detects electrical changes, such as changes in capacitance, changes in an electrostatic field, or the like, that are generated by a user touching the interface 40 of the touchscreen 30. In another example, the sensing grid 66 detects changes in capacitance, changes in an electrostatic field, or the like, due to a user's manipulation of the physical knob 32 and/or the physical button 34. The position information is collected by an HMI 20 controller 78. The controller 78 converts the position information into function selection information and directs the interface 40 of the HMI 20 and in some examples, the displays 54 of the physical knob 32 and/or the buttons 34 to depict information relevant to the function selected by the user.

As described above, the controller 78 is an electronic control device having a preprogrammed digital computer or processor 80, memory 82 or non-transitory computer readable medium used to store data such as control logic, software applications, instructions, computer code, software, or applications, data, lookup tables, etc., and a transceiver [or input/output ports] 84. The computer readable medium or memory 82 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium 82 excludes wired, wireless, optical, or other communication links that transport transitory electrical or other signals. A non-transitory computer readable medium 82 includes media where data can be permanently stored and media where data can be stored and later overwritten, such as a rewritable optical disc or an erasable memory device. Computer code, software, or applications includes any type of program code, including source code, object code, and executable code. The processor 80 is configured to execute the code or instructions A pitch "P" or spacing between the electronic traces 68 of the sensing grid 66 determines one aspect of the precision and accuracy of the sensing grid 66 of the touchscreen 30. The quantity, size, and placement of the contact pads 52 of the physical knob 32 and/or physical button 34 determines a second aspect of the precision and accuracy of the sensing grid 66 of the touchscreen 30. More specifically a sensing node 76 to pitch "P" ratio determines a granularity of the position information generated by the sensing grid 66. The ratio of sensing nodes 76 to pitch of the sensing grid 66 is optimized for an ideal number of registrations per contact pad 52 depending on the application. Registrations for each contact pad 52 occur as the contact pad 52 passes over or near a sensing node 76. Accordingly, a diameter "D" of each contact pad 52, and the location of each contact pad 52 on the physical knob 32 and/or physical button 34 is selected to optimize the number of registrations possible as a given contact pad 52 traverses the touchscreen 30.

Figure 5:
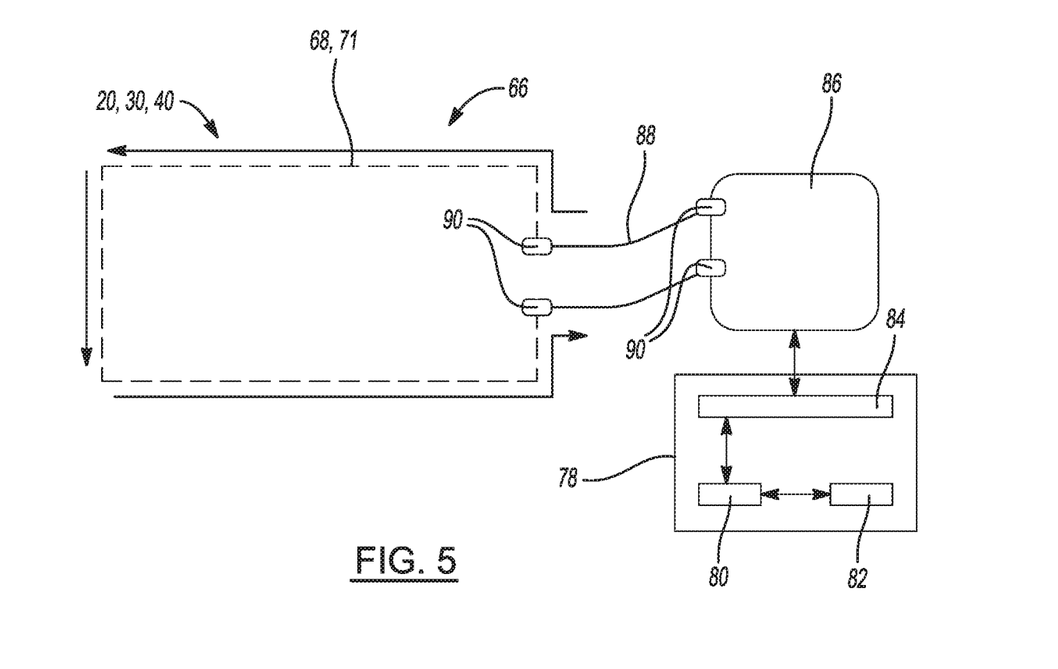
FIG. 5 is a schematic view of a portion of a sensing grid of an HMI having a touch sensor and a plurality of electrical traces defining a perimeter of the sensing grid of the HMI according to an aspect of the present disclosure.

Turning now to FIG. 5 and with continuing reference to FIGS. 1-4, the controller 78 performs diagnostic functions. Based on data collected from the sensing grid 66, and more specifically based on data relating to the continuity of a third plurality of electronic traces 68 making up the perimeter 71 of the interface 40 of the touchscreen 30, the controller 78 makes determinations of the utility, accuracy, age, functionality of the touchscreen 30. In some aspects, the third plurality of electronic traces 68 of the perimeter 71 is connected to a touch sensor 86 by a flat panel cable 88. The flat panel cable or "FPC" 88 forms an electrical interface between the touch sensor 86 and the electronic traces 68 of the interface 40 of the touchscreen 30. In some examples, the FPC 88 is connected to the electronic traces 68 by a soldered connection such as a micro-soldered connection 90, while in other examples, the FPC 88 is connected by an interference fit (not specifically shown). The touch sensor 86 communicates electronically with the controller 78 and relates positional information of the contact pads 52 and/or of a user's hand or finger to the controller. The touch sensor 86 also performs diagnostic functions in conjunction with the controller. That is, the controller 78 is in electronic communication with the electronic traces 68 of the sensing grid 66 and more generally, in electronic communication with the touch sensor. The memory 82 of the controller 78 stores control logic and the processor 80 executes the control logic. In several aspects, the control logic includes at least a first logic for determining a state of the touchscreen 30 interface 40, and a second logic for determining a state of a portion of the touchscreen 30 interface 40 smaller than a full area of the touchscreen 30 interface 40. In some examples, the processor 80 executes a third control logic for determining whether a majority of the contact pads 52 disposed on the physical button 32 or physical knob 34 are interacting with the sensing nodes 76. Moreover, the third control logic, as will be described in more detail in the examples below, selectively generates and stores a diagnostic code in the memory 82 and selectively generates a notification for a user of the HMI 20 regarding the a condition or state of the touchscreen 30 interface 40.

In a first example, a glass, plastic, or other similar surface (not specifically shown) of the touchscreen 30 may break after the touchscreen 30 has been subjected to physical or thermal trauma. Because in many instances, the electronic traces 68 are either embedded within the glass or adhered to the glass, when the glass of the touchscreen 30 breaks, continuity of the interface 40 surface as well as continuity of the electronic traces 68 may be broken or damaged as well. Likewise, in a second example in which the touchscreen 30 has been subjected to a high humidity environment or a corrosive liquid, the electronic traces 68 may be damaged as well. Similarly, in a third example the FPC 88 may under some circumstances become partially or fully detached from the electronic traces 68, or the FPC 88 may have bonding issues with respect to the electronic traces 68. When any of the situations described in the first through third examples above occurs, continuity of the electronic traces 68, the FPC 88, and therefore the touchscreen itself 30 is diagnosable by the controller. If the controller 78 determines there is a continuity fault, the controller 78 sets a diagnostic code in memory and selectively displays a notification to the driver or operator of the motor vehicle 10 representing the state of the touchscreen 30 or a portion of the touchscreen 30. In some aspects, when a partial decrease in continuity is detected, the controller 78 executes an algorithm that alters the functionality of the touchscreen 30 by decreasing a precision required to perform certain functions. The touchscreen 30 thereafter becomes less accurate and precise, but still functions for its intended purpose. By slowly decreasing the precision and/or accuracy required to perform functions on the touchscreen 30, aging effects such as corrosion, partially broken glass, increased resistance in the electronic traces 68 or the FPC 88 can be mitigated, thereby allowing users to prolong use of the touchscreen 30 before repairs or replacement of the touchscreen 30 are required. Additionally, as the controller 78 determines there are continuity faults, the controller 78 executes a plurality of additional algorithms that determine a prognosis of the electronic traces 68 of the touchscreen 30, including lifespan and early failure prediction. By calculating lifespan and early failure prediction parameters, the controller 78 can preemptively notify a user of the touchscreen 30 that the touchscreen 30 has an approximate lifespan and/or notify a service center, or the like, of a need to service the user's touchscreen 30.

Figure 6:
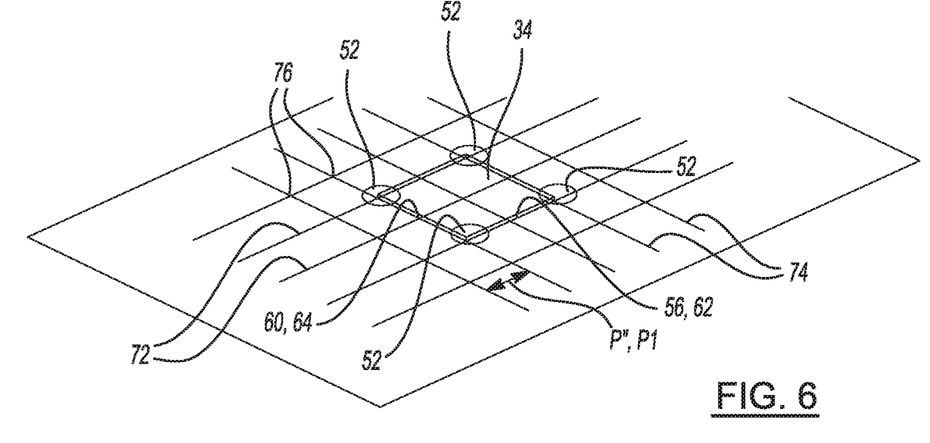
FIG. 6 is a schematic view of a portion of a sensing grid of an HMI having a button according to an aspect of the present disclosure.

The spacing or pitch "P" of the sensing grid 66 of some examples varies across the sensing grid 66. In the example of FIG. 6, the sensing grid 66 has an increased density or pitch "P1" proximate the physical knob 32 and proximate the buttons 34. By contrast in a region between the physical knob 32 and the buttons 34 and in a region intended for use by a user's finger, the sensing grid 66 has a decreased density or pitch "P2". The increased density or pitch "P1" of the regions of the sensing grid 66 proximate the physical knob 32 and the buttons 34 provides high granularity in positional data generated by use of the physical knob 32 and buttons 34. In one example, each of the contact pads 52 of the physical knob 32 and/or the buttons 34 has a predetermined diameter "D" of about two to three millimeters (2-3 mm). Accordingly the increased density or pitch "P1" of the electronic traces 68 provides an increased quantity of sensing nodes 76 with which the contact pads 52 register and interact. By contrast, a human finger, when used with a touchscreen 30 has a touch diameter of approximately four to fifteen millimeters (4-15 mm). Accordingly, a human finger will interact with high precision and granularity with sensing nodes 76 spaced farther apart than those necessary for use with the physical knob 32 and/or buttons 34. In further examples, a stylus (not specifically shown) may be used with the touchscreen 30. Since the stylus may have a tip diameter of less than that of a human finger (i.e. less than 7-15 mm), but still greater than the 2-3 mm diameter of a contact pad 52, the sensing grid 66 is designed with a pitch "P" somewhere between that of the above described P1 and P2 regions. While the diameter "D" of the contact pads 52 have been described as being between 2-3 mm, a tip diameter of the stylus being somewhat larger than 2-3 mm, but less than the touch diameter of a finger (7-15 mm), it should be appreciated that the diameter values described may vary substantially depending on the application, the individual stylus, and the user. Accordingly, it should be understood that the aforementioned diameters are intended to merely nonlimiting but representative examples.

Turning now to FIG. 6, and with continuing reference to FIGS. 1-5, a touchscreen 30 having buttons 34 is shown in more detail. The buttons 34 are disposed on the interface 40 of the touchscreen 30 as described hereinabove. In several aspects, the contact pads 52 of the buttons 34 are spring loaded. The spring loaded contact pads 52 (not specifically shown) provide the physical button 34 with the ability to move vertically, i.e. perpendicularly upward and downward in relation to the substantially planar interface 40 of the touchscreen 30, while preventing the contact pads 52 from permanently and continuously contacting the interface 40 of the touchscreen 30. That is, when the buttons 34 are not being manipulated by a user, the spring loaded contact pads 52 are separated from the interface 40 surface of the touchscreen 30 by a predetermined distance, and the sensing nodes 76 detect a proximity of the contact pads 52. In some examples the sensing grid 66 performs diagnostics to determine the presence of the physical button 32, and sets a code in memory if the physical button 32 is not detected. That is, if the physical button 32 detaches from the interface 40 screen, the contact pads 52 are not sensed at all by the sensing grid 66, and the controller sets a code in memory indicating as much. By contrast, when the buttons 34 are pressed by a user, the spring loaded contact pads 52 are pressed onto the interface 40 of the touchscreen 30. In either the case of a physical knob or physical button 32, 34 when the contact pads 52 are pressed onto the interface 40 of the touchscreen 30, the contact pads 52 register at least one of: a presence, an absence, or a proximity of a contact pad 52 disposed on the physical knob 32 or physical button 34 with the sensing nodes 76 of the sensing grid 66 thereby generating positional information. In some aspects, the spring loading of the contact pads 52 is accomplished by way of a spring, an elastomeric pad, or other such resilient member sandwiched between the physical knob 32 or physical button 34 and the interface 40 surface.

Figure 7:
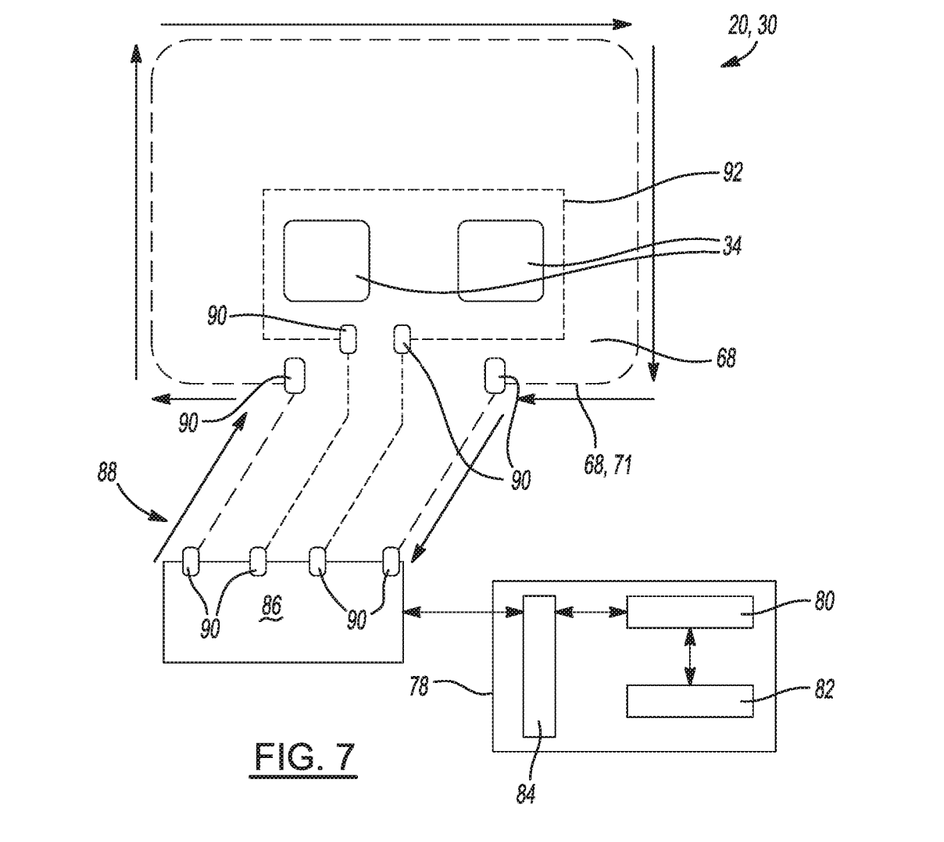
FIG. 7 is a schematic view of a portion of a sensing grid of an HMI having a plurality of electrical traces defining a perimeter of the sensing grid of the HMI and a plurality of electrical traces defining a perimeter of a portion of the sensing grid of the HMI that is smaller than the entire perimeter of the sensing grid.

Turning now to FIG. 7 and with continuing reference to FIGS. 1-6, the electronic traces 68 of the sensing grid 66 include a fourth plurality of electrical traces 68 forming a button zone 92. The button zone 92 is a loop of electronic traces 68 defining a region of the touchscreen 30 interface 40 optimized for use with the physical button 34. In several aspects, the button zone 92 interacts with the controller 78 and the touch sensor 86 via the FPC 88. In several aspects, the button zone 92 of the sensing grid 66 is optimized to detect a presence or absence of the contact pads 52 of the buttons 34. The button zone 92 of the sensing grid 66 is also used for diagnostic purposes. Because the button zone 92 itself can be checked for continuity, resistance, and the like, the electronic traces 68 of the button zone 92 are used by the controller 78 and the touch sensor 86 to determine whether the electronic traces 68 of the button zone 92 are intact or whether the electronic traces 68 of the button zone 92 have been damaged, corroded, or otherwise operationally compromised. In several aspects, the fourth plurality electrical traces 68 form a plurality of loops of electronic traces 68 throughout the sensing grid 66. The plurality of loops of electronic traces 68 are used to determine whether the interface 40 of the touchscreen 30 is intact and fully functional or if some or all of the sensing grid 66 of the touchscreen 30 interface 40 has been damaged or is suffering efficiency losses.

A system and method for performing failure diagnostics of touch-based HMI 20 systems, including digital rotary physical knob 32 encoders, push-buttons 34, and touchscreen 30 modules of the present disclosure offers several advantages including new and improved touch-based HMIs 20 and diagnostic systems and methods for improved touch-based HMIs 20 that meet regulatory standards while decreasing driver distractions, and while increasing the resiliency, robustness, and accuracy of diagnostics for the touch-based HMIs 20.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for failure diagnostics for a Human Machine Interface (HMI) comprising:
   a physical knob;
   a button;
   a touchscreen interface;
   the physical knob and the button disposed on the touchscreen interface and in communication with the touchscreen interface;
   a touch sensor in communication with the touchscreen interface;
   a controller in communication with the touch sensor, the controller having memory for storing control logic and a processor configured to execute the control logic, the control logic including a first logic for determining a state of the touchscreen interface, and a second logic for determining a state of a portion of the touchscreen interface smaller than a full area of the touchscreen interface,
   each of the physical knob and the button further comprising a plurality of contact pads disposed on a lower surface of the physical knob and proximate the touchscreen interface and a lower surface of the button proximate the touchscreen interface, the touchscreen interface further comprising a sensing grid in communication with the touch sensor via a cable, the sensing grid having electrical traces, and wherein a first plurality of electrical traces electrically interacts with a second plurality of electrical traces, and forms a plurality of sensing nodes, and wherein the first logic further comprises:

determining, from data generated by a third plurality of electrical traces defining a perimeter of the touchscreen interface, an electrical and physical continuity of an entire surface of the touchscreen interface, and wherein the second logic further comprises:

determining, from data generated by a fourth plurality of electrical traces defining a button zone or loop in the portion of the touchscreen interface smaller than the full area of the touchscreen interface, an electrical and physical continuity of the surface of the touchscreen interface making up the portion of the touchscreen interface.

2. The system for failure diagnostics for an HMI of claim 1 wherein the plurality of contact pads is distributed asymmetrically across the lower surface of the physical knob.

3. The system for failure diagnostics for an HMI of claim 1 wherein the plurality of contact pads have a predetermined diameter selected to interact with the plurality of sensing nodes.

4. The system for failure diagnostics for an HMI of claim 1 wherein the sensing nodes register at least one of: a presence, an absence, or a proximity of a contact pad disposed on the physical knob or button.

5. The system for failure diagnostics for an HMI of claim 4 further comprising a third logic for determining whether a majority of the contact pads disposed on the button and the physical knob are interacting with the sensing nodes, and selectively generating and storing a diagnostic code in memory and selectively generating a notification for a user of the HMI.

6. The system for failure diagnostics for an HMI of claim 1 wherein a pitch of the electrical traces comprising the sensing grid is variable across the touchscreen interface.

7. The system for diagnostics for an HMI of claim 6 wherein a first pitch of the electrical traces comprising the sensing grid is optimized for use with the physical knob and the button.

8. The system for diagnostics for an HMI of claim 7 wherein a second pitch of the electrical traces comprising the sensing grid is optimized for use with a finger, and wherein the first pitch is smaller than the second pitch.

9. A system for failure diagnostics for a Human Machine Interface (HMI) in a motor vehicle comprising:
a physical knob;
a button;
a plurality of contact pads disposed on a lower surface of each of the physical knob and the button;
a touchscreen interface having a plurality of electrical traces disposed at predefined angles to one another forming a sensing grid having a plurality of sensing nodes;
the physical knob and the button disposed on the touchscreen interface and in communication with the touchscreen interface via the contact pads;
a touch sensor in communication with the touchscreen interface through a cable; and
a controller in communication with the touch sensor, the controller having memory for storing control logic and a processor configured to execute the control logic, the control logic including a first logic for determining an electrical continuity of the touchscreen, a second logic for determining an electrical continuity of a portion of the touchscreen smaller than a full area of the touchscreen, and a third logic for determining whether a majority of the contact pads disposed on the button and the physical knob are interacting with the sensing grid and selectively generating and storing a diagnostic code in memory and selectively generating a notification for a user of the HMI.

10. The system for failure diagnostics for an HMI of claim 9 wherein the plurality of contact pads is distributed asymmetrically across a lower surface of the physical knob and across a lower surface of the button.

11. The system for failure diagnostics for an HMI of claim 9 wherein the plurality of contact pads have a predetermined diameter selected to interact precisely with the plurality of sensing nodes, and wherein the sensing nodes register at least one of: a presence, an absence, or a proximity of at least one contact pad disposed on the physical knob or button.

12. The system for failure diagnostics for an HMI of claim 9 wherein a pitch of the electrical traces comprising the sensing grid is variable across the touchscreen interface.

13. The system for diagnostics for an HMI of claim 12 wherein a first pitch of the electrical traces comprising the sensing grid is optimized for use with the physical knob and the button.

14. The system for diagnostics for an HMI of claim 13 wherein a second pitch of the electrical traces comprising the sensing grid is optimized for use with a finger, and wherein the first pitch is smaller than the second pitch.

15. The system for diagnostics for an HMI of claim 9 wherein the first logic further comprises:
determining, from data generated by a third plurality of electrical traces defining a perimeter of the touchscreen interface, an electrical and physical continuity of an entire surface of the touchscreen interface, and wherein the second logic further comprises:
determining, from data generated by a fourth plurality of electrical traces defining a button zone or loop in the portion of the touchscreen interface smaller than the full area of the touchscreen interface, an electrical and physical continuity of the surface of the touchscreen interface making up the portion of the touchscreen interface.

16. The system for diagnostics for an HMI of claim 9 wherein the third logic further comprises generating an estimated position of the physical knob and the button based on a position of the majority of the contact pads.

17. A system for diagnostics for a Human Machine Interface (HMI) in a motor vehicle comprising:
a touchscreen interface having a plurality of electrical traces disposed at predefined angles to one another forming a sensing grid, a first plurality of electrical traces intersects at the predefined angles with a second plurality of electrical traces, and forms a plurality of sensing nodes at each intersection, a pitch of the electrical traces comprising the sensing grid being variable across the touchscreen interface, wherein a first pitch of the electrical traces comprising the sensing grid is optimized for use with a physical knob and a button;
a plurality of contact pads disposed asymmetrically on a lower surface of each of the physical knob and the button, the contact pads having a predetermined diameter selected to interact precisely with the plurality of sensing nodes, and wherein the plurality of sensing nodes register at least one of: a presence, an absence, or a proximity of at least one contact pad disposed on the physical knob or button, and wherein a second pitch of the electrical traces comprising the sensing grid is optimized for use with a finger, and wherein the first pitch is smaller than the second pitch;

the physical knob and the button disposed on the touchscreen interface and in communication with the touchscreen interface via the contact pads;

a touch sensor in communication with the touchscreen interface through a cable; and a controller in communication with the touch sensor, the controller having memory for storing control logic and a processor configured to execute the control logic, the control logic including a first logic for determining, from data generated by a third plurality of electrical traces defining a perimeter of the touchscreen interface, an electrical and physical continuity of an entire surface of the touchscreen interface, a second logic for determining, from data generated by a fourth plurality of electrical traces defining a button zone or loop in a portion of the touchscreen interface smaller than a full area of the touchscreen interface, an electrical and physical continuity of the surface of the touchscreen interface making up the portion of the touchscreen interface, and a third logic for determining whether a majority of the contact pads disposed on the button and the physical knob are interacting with the sensing grid and selectively generating and storing a diagnostic code in memory and selectively generating a notification for a user of the HMI, the third logic generating an estimated position of the physical knob and the button based on a position of the majority of the contact pads.

* * * * *